United States Patent [19]

Nanae et al.

[11] Patent Number: 5,754,025
[45] Date of Patent: May 19, 1998

[54] IRON CORE MOTOR DEVICE

[75] Inventors: Yuichi Nanae, Saitama; Koichi Inagaki, Chiba, both of Japan

[73] Assignee: Sony Corporation, Tokyo, Japan

[21] Appl. No.: 364,618

[22] Filed: Dec. 27, 1994

[30] Foreign Application Priority Data

Dec. 28, 1993 [JP] Japan ................... 5-336256

[51] Int. Cl.$^6$ ................................. H02K 37/00
[52] U.S. Cl. .................. 318/747; 318/254; 318/685; 318/696
[58] Field of Search ................. 318/138, 139, 318/245, 254, 439, 747, 800–832

[56] References Cited

U.S. PATENT DOCUMENTS

| | | | |
|---|---|---|---|
| 5,446,354 | 8/1995 | Hiruma | 318/439 |
| 5,627,441 | 5/1997 | Sakurai et al. | 318/599 |
| 5,627,447 | 5/1997 | Unsworth et al. | 318/801 |
| 5,631,999 | 5/1997 | Dinsmore | 388/805 |

*Primary Examiner*—Paul Ip
*Attorney, Agent, or Firm*—Limbach & Limbach L.L.P.

[57] ABSTRACT

An iron motor device includes an iron core motor the rotor of which is rotationally driven a pre-set angle by electromagnetic induction responsive to phase switching of current supply to two-phase coils wound on an iron core, and a driving control unit for generating a driving control signal based on the phase information of differentially phased backward voltages induced in the two-phase coils. The driving control unit causes shorting of the backward voltage induced in the coil the current supply in which is interrupted by phase switching of current supply to the two-phase coils by providing a pre-set time delay in the turn-off timing of the switching device connected to the coil the current conduction in which is interrupted. The method for drive controlling the iron core motor device is also disclosed.

9 Claims, 12 Drawing Sheets

CHANGE IN A-PHASE MAGNETIC FLUX DENSITY $\frac{d\phi A}{d\theta}$

CHANGE IN B-PHASE MAGNETIC FLUX DENSITY $\frac{d\phi B}{d\theta}$

BACKWARD VOLTAGE

BACKWARD VOLTAGE AND IMPRESSED VOLTAGE

CURRENT FLOWING IN A-PHASE COIL

F I G. 4(a)
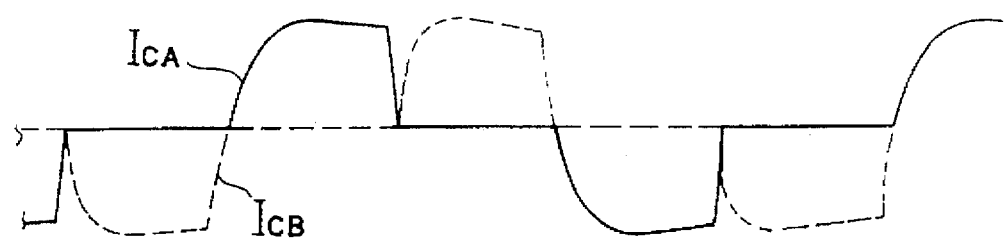
F I G. 4(b)

OVERLAP DOMAIN

IRON CORE MOTOR DEVICE

BACKGROUND OF THE INVENTION

This invention relates to an iron core motor device and a driving method therefor. More particularly, it relates to an iron core motor device having an iron core motor for rotating a rotor by commuting the phase in current supply to a plurality of exciting winding coils, and a driving method therefor.

A stepping motor employs pulse signals as driving signals therefor and drives its rotor in intermittent rotation a pre-set angle per each pulse signal. Thus it is possible for the stepping motor to control the rotational speed by controlling the number of driving pulses supplied per unit time.

There has been known a stepping motor in which a stator has plural exciting coils about the outer periphery of a rotor in the form of a cylindrical permanent magnet. The rotor of the stepping motor has plural magnetized portions the direction of magnetization of which is alternated at each pre-set angle in the circumferential direction. The stator has teeth facing the magnetized portions of the rotor and about which exciting coils making up two-phase coils, for example, are wound. Rotation of the rotor is produced by commuting the phase of current supply to each exciting coil.

The known driving method for the stepping motor is roughly classified into a uni-polar driving method of causing the current to flow only in one of the coils constituting each phase and a bi-polar driving method of causing the current to flow in the coils constituting each phase by alternately commuting the current direction.

The conventional driving circuit for bi-polar driving of the two-phase stepping motor is explained by referring to FIG. 1. The driving circuit 1 shown in FIG. 1 includes a driving section 2 for rotating the rotor by flowing a pulsed driving current (driving pulse) through a two-phase coil and a driving control section 3 for controlling the driving timing of the driving section 2. The driving section 3 is made up of a backward voltage detector 4 for detecting the backward voltage generated across coil ends of each phase and a driving logic 5 for outputting a timing signal driving the driving section 2 based on a signal from the backward voltage detector 4. The driving circuit 1 finds the relative position between the rotor and the coils, based upon the backward voltage induced in the coils, that is a change in magnetic flux density φ of the coils of each phase relative to the angle electric Θ, or dφ/dΘ, and generates a driving pulse based upon such position information between the rotor and the coils, for driving the stepping motor.

Specifically, when the rotor is rotated, the magnetic flux through the coils $C_A$, $C_B$ of the magnetized portions of the rotor is changed, such that changes in the magnetic flux in the coils $C_A$ and $C_B$, that is $d\phi_A/d\Theta$ and $d\phi_B/d\Theta$, have the phase difference of π/2, as shown in FIGS. 2a and 2b.

The backward voltage induced in the coils is proportional to changes in the magnetic flux density. That is, the backward voltage $V_A$ as shown in FIG. 2c is generated in the coil $C_A$ of a phase A, while the backward voltage $V_B$ as shown in FIG. 2c is generated in the coil $C_B$ of a phase B. If the rotor is rotated in the opposite direction, a backward voltage shown at $V_A'$ of the phase A is generated, as shown in FIG. 2c, whereas a backward voltage shown at $V_B'$ of the phase B is generated, as also shown in FIG. 2c. The backward voltage detection circuit 4 detects zero-crossing points $P_1$, $P_2$, $P_3$, . . . of the backward voltage by, for example, a differential amplifier circuit, not shown, for detecting the position information. Current supply to the coils $C_A$ and $C_B$ is then carried out based upon such position information.

Specifically, the impressed voltage $V_0$ for current supply to the phase A coil $C_A$ is extended over π/4 on both sides of the zero-crossing point $P_1$ located at an electrical angle π/2. Thus the driving logic 5 generates a timing signal rising at π/4 and falling at 3π/4, based upon the position information detected by the backward voltage detection circuit 4, and routes the resulting timing signal to the driving section 2. The driving section 2 impresses a driving voltage $V_0$, synchronized to the timing signal, to the coil $C_A$. The current $I_A$ flowing in the phase A coil $C_A$ responsive to the impressed voltage $V_0$ has a waveform as shown in FIG. 2e. Current supply to the phase B coil $C_B$ is carried out in the same way as that to the phase A coil $C_A$. The current conduction angle to the coil $C_B$ is delayed π/2 from that to the coil $C_B$.

By detecting the phase information by detecting the backward voltage to the respective phase coils $C_A$ and $C_B$, it becomes possible for the driving circuit 1 to drive the stepping motor correctly without employing a position sensor for detecting the position information, such as Hall device.

The operation of the driving section 2 is now explained.

The basic construction of one of the coils of the driving section 2 shown in FIG. 1 is shown in FIG. 3a. If transistors Tr1, Tr4 are turned on simultaneously, the exciting current $I_A$ flows through the transistor Tr1, a coil C and the transistor Tr4. This exciting current $I_A$ is the current flowing in the phase A coil $C_A$. If the transistors Tr1, Tr4 are turned off and subsequently transistors Tr2, Tr3 are turned on simultaneously, an exciting current flows through the transistor Tr3, coil C and the transistor Tr2 in an opposite direction to that of the exciting current $I_A$. Repetition of the above operation produces the bipolar driving of the stepping motor.

Meanwhile, if the transistors Tr1, Tr4 are turned off simultaneously, a reverse voltage (kickback voltage) is generated in the coil C. In order to prevent the transistor from being destroyed by the backward voltage $V_K$ resulting from the inductance of the coil C, closure diodes $D_1$ to $D_4$ are connected across the collectors and the emitters of the transistors Tr1 to Tr4, as shown in FIG. 3a. The closure current i(t) by the backward voltage $V_K$ flows through the closure diode $D_2$, coil C and the closure diode $D_3$. FIG. 3b shows an equivalent circuit illustrating the flow of the closure current i(t). That is, if, while a switch $S_W$ is turned on to permit the exciting current $I_A$ to flow, the switch $S_W$ is turned off, the closure current i(t) flows due to the backward voltage $V_K$ of the coil C. If the forward voltage drop of the diodes is $V_f$, the on-resistance of the diodes is $r_0$, the inductance of the coil is L and the inner resistance of the coil is $R_m$, the closure current i(t) is given by $$i(t) = \left(I_0 + \frac{2V_f}{R_m}\right) e^{-\frac{R_m}{L}t} - \frac{2V_f}{R_m} \quad (1)$$

It is assumed that the two-phase stepping motor is driven stepwise by supplying driving pulses dephased π/2 to each other to the coils $C_A$ and $C_B$. In the driving current 1 shown in FIG. 1, currents $I_{CA}$ and $I_{CB}$ respectively flowing through the phase A coil $C_A$ and the phase B coil $C_B$ are as shown at FIG. 4a. On the other hand, the coil voltage V across the ends of the phase A coil $C_A$ is as shown in FIG. 4b. If the backward voltage $V_K$ is generated in the phase A coil $C_A$, the current which should flow in the phase A coil $C_A$ on turning on the transistors Tr2 and Tr3 is inhibited by the backward voltage $V_K$, as shown by the current waveform shown in FIG. 4a. That is, the exciting current which should flow through the coil $C_A$ cannot flow unless the backward voltage $V_K$ is lowered. In other words, with the conventional iron-core motor device, current sag due to inductance cannot be compensated, such that a torque ripple $Tr_1$ is produced on generation of the backward voltage. The result is that the rotational torque of the stepping motor is lowered by such torque ripple $Tr_1$.

SUMMARY OF THE INVENTION

It is therefore an object of the present invention to provide an iron core motor device and a driving method therefor by means of which the above-mentioned problems may be resolved.

In one aspect, the present invention provides an iron motor and a driving control unit. The iron core motor has a rotor rotationally driven a pre-set angle by electromagnetic induction responsive to phase switching of current supply to two-phase coils wound on an iron core. The driving control unit generates a driving control signal based on the phase information of differentially phased backward voltages induced in the two-phase coils. The driving control unit causes shorting of the backward voltage induced in the coil the current conduction in which is interrupted by phase switching of current supply to the two-phase coils by introducing a pre-set time delay in the turn-off timing of the switching device connected to the coil the current conduction in which is interrupted.

In another aspect, the iron motor device according to the present invention similarly includes an iron core motor and driving control means. The iron core motor includes a rotor rotationally driven a pre-set angle by electromagnetic induction responsive to phase switching of current supply to a plurality of coils wound on an iron core. The driving control means shorts the kickback voltage generated in an exciting winding the current conduction in which is interrupted by phase switching by delaying the timing the switching device connected to the exciting winding is turned off.

In still another aspect, the present invention provides a method for driving and controlling an iron motor device comprising an iron core motor the rotor of which is rotationally driven a pre-set angle by electromagnetic induction responsive to phase switching of current supply to the two-phase coils wound on an iron core. The method includes producing a driving control signal on the basis of the phase information of the differently phased backward voltages generated in the two-phase coils by commuting the phase of current supply to the two-phase coils, and shorting of the backward voltage induced in the coil the current conduction in which is interrupted by commuting the phase of current supply to the two-phase coils by introducing a pre-set time delay in the turn-off timing of the switching device connected to the coil the current supply in which is interrupted.

According to the present invention, the backward voltage induced in the exciting winding the current supply in which is interrupted by phase switching is shorted by delaying the timing at which the switching device connected to the exciting winding is turned off, thereby facilitating the flow of the driving current while reducing the torque ripple. Thus it becomes possible for a motor having high inductance to have a high torque.

BRIEF DESCRIPTION OF THE DRAWINGS

FIG. 4 is a waveform diagram showing the waveforms of the voltage and the current flowing from the driving circuit to the coil.

DESCRIPTION OF THE PREFERRED EMBODIMENTS

Figure 1:
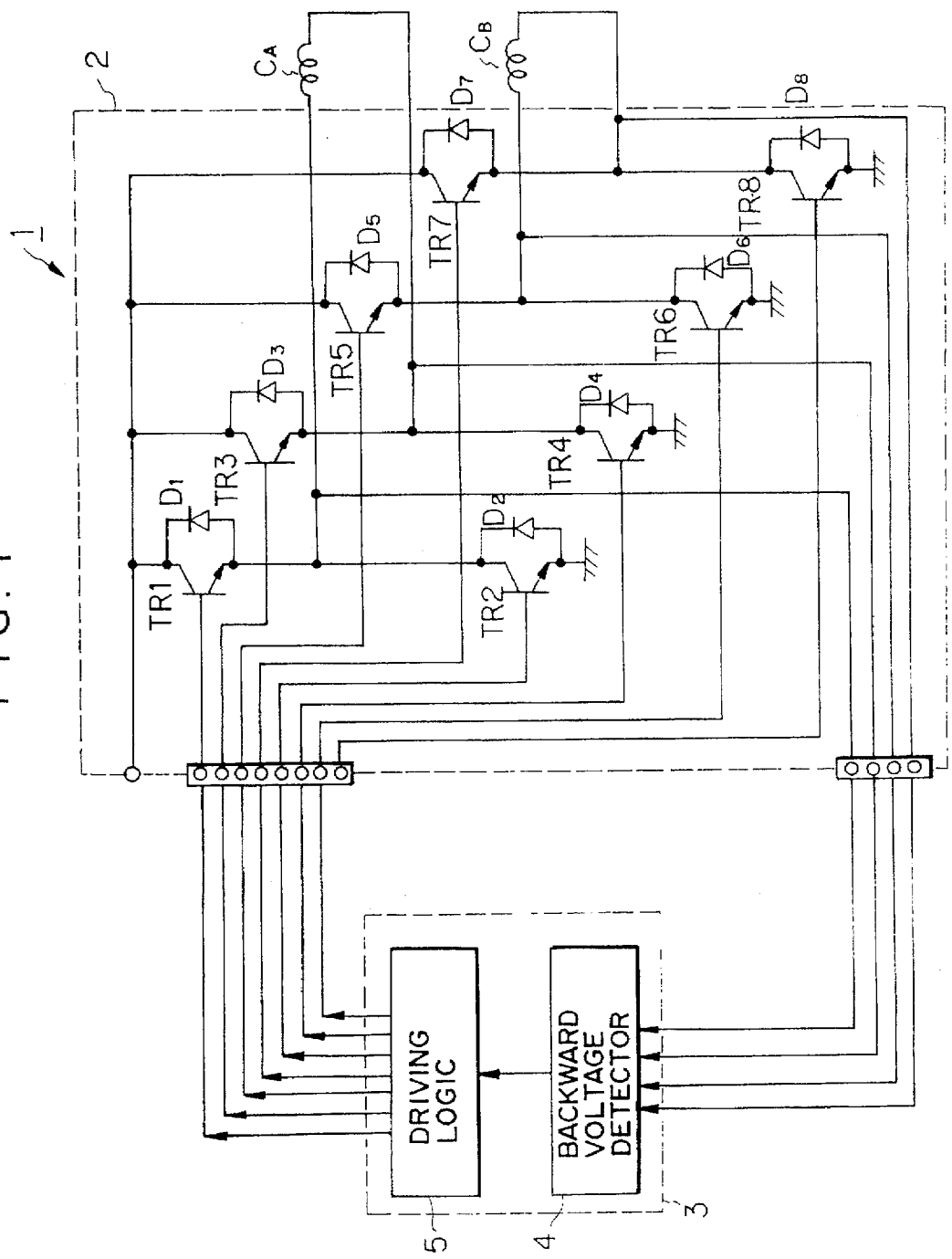
FIG. 1 is a schematic block diagram showing a driving circuit in a conventional iron core motor device.
Figure 2A:
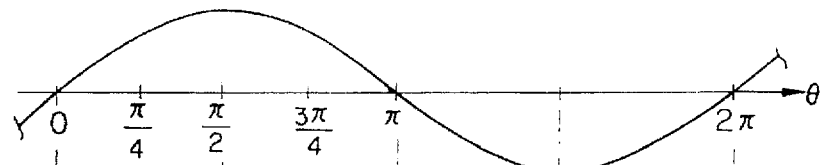
FIG. 2 shows various waveforms for illustrating the operation of the iron core motor device shown in FIG. 1.
Figure 2B:
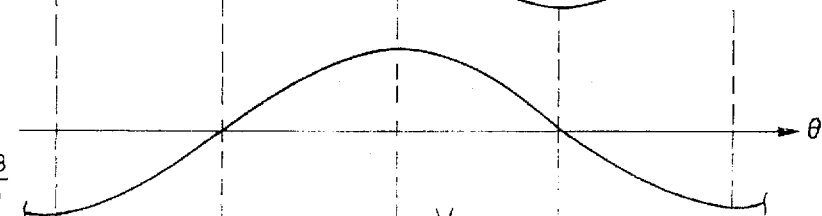
Figure 2C:
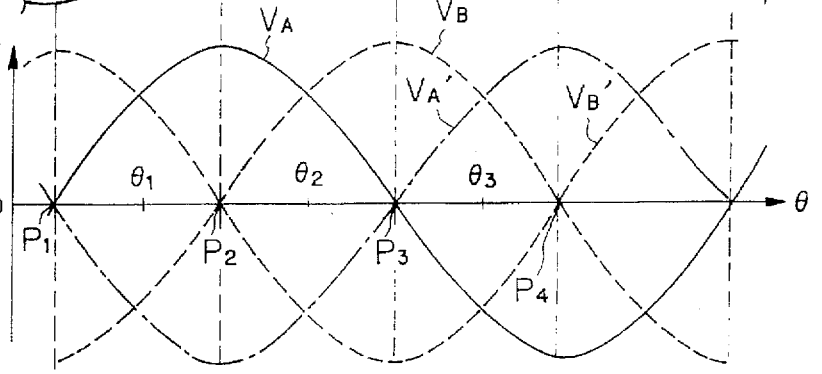
Figure 2D:
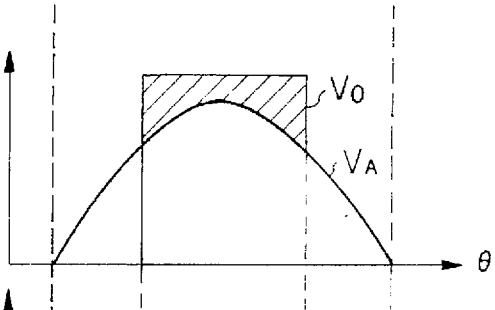
Figure 2E:
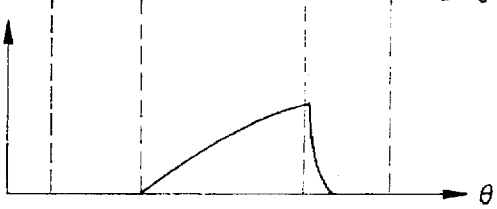
Figure 3A:
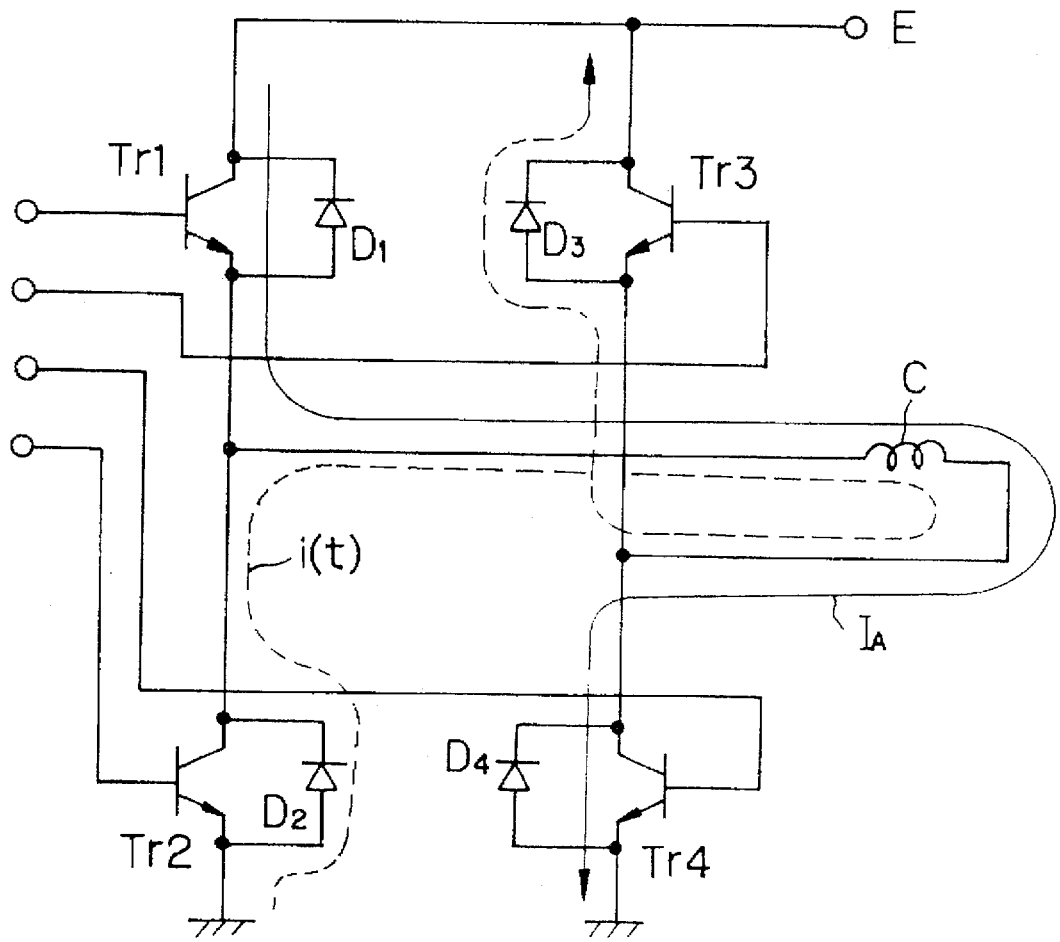
FIG. 3 is a circuit diagram showing an arrangement of a driving unit driving a coil of one of the phases in the above driving circuit.
Figure 3B:
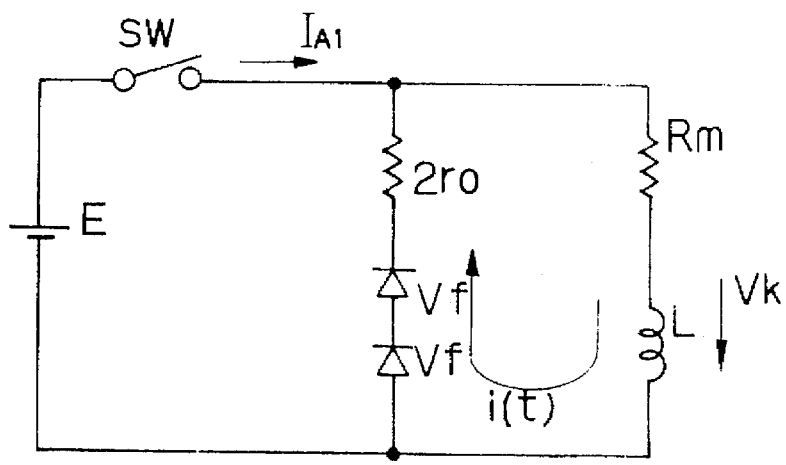

Referring to the drawings, preferred embodiments of an iron core motor device according to the present invention will be explained in detail.

First, an iron core motor constituting an iron core motor device according to the present invention is explained. The present iron core motor is a claw-pole type stepping motor having a stator in which plural pole tooth yokes are inter-engaged with one another.

Figure 5:
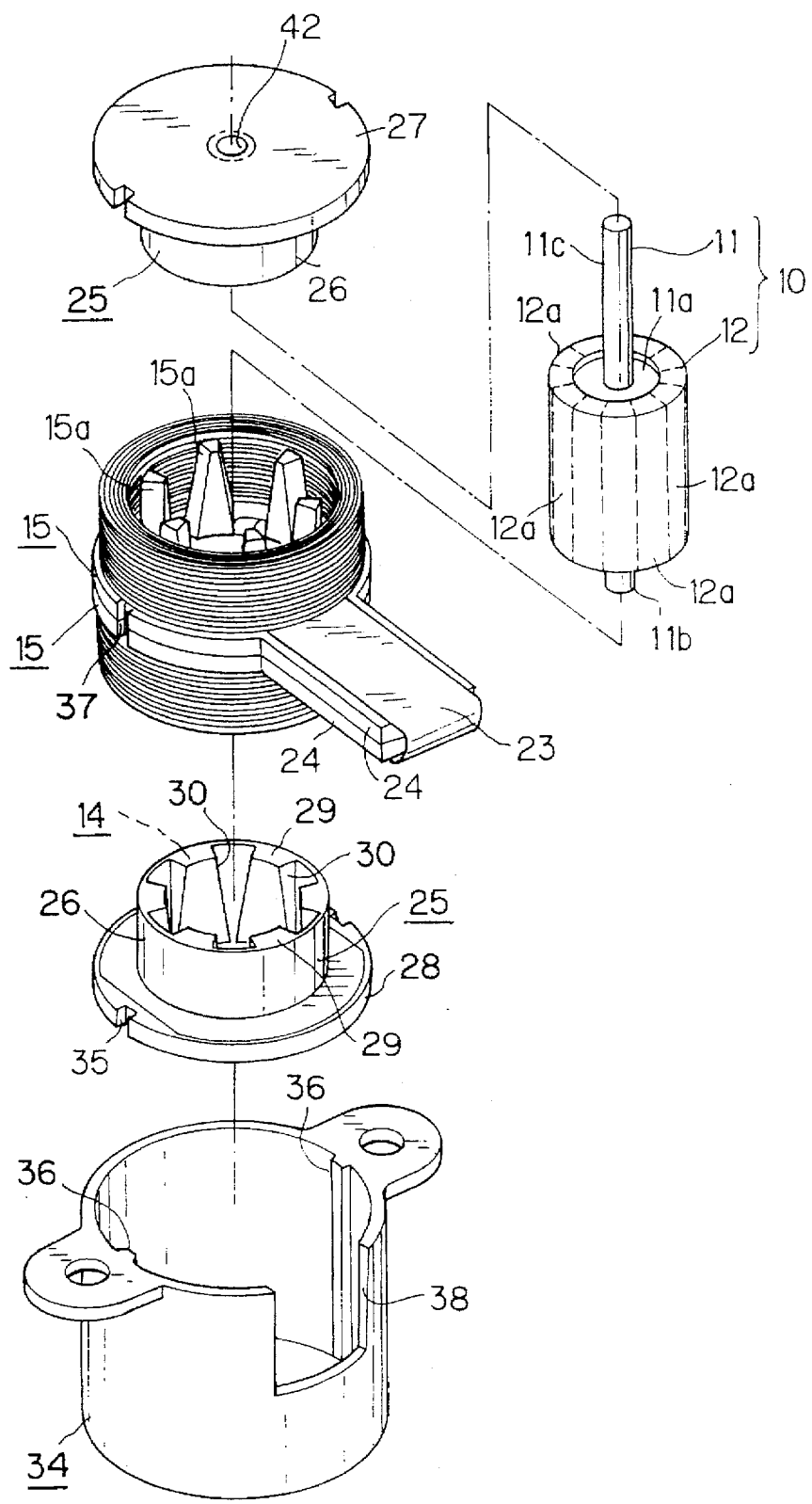
FIG. 5 is an exploded perspective view showing an iron core motor according to the present invention.

The present stepping motor has a magnet as a rotor 10 and, as shown in FIG. 5, has a rotor 10 having a rotor shaft 11 and a cylindrical magnet 12 provided around the rotor shaft. The magnet 12 constituting the rotor 10 has plural magnetized portions 12a having alternating poles in the circumferential direction. In the present embodiment, the magnet 12 has 12 such magnetized portions 12a. On the inner peripheral side of the cylindrical magnet 12 is fitted a sleeve 11a as a mounting member for the rotor shaft 11. The magnet 12 is integrally mounted on the rotor shaft 11 by intimately fitting the sleeve 11a on the rotor shaft 11.

Figure 6:
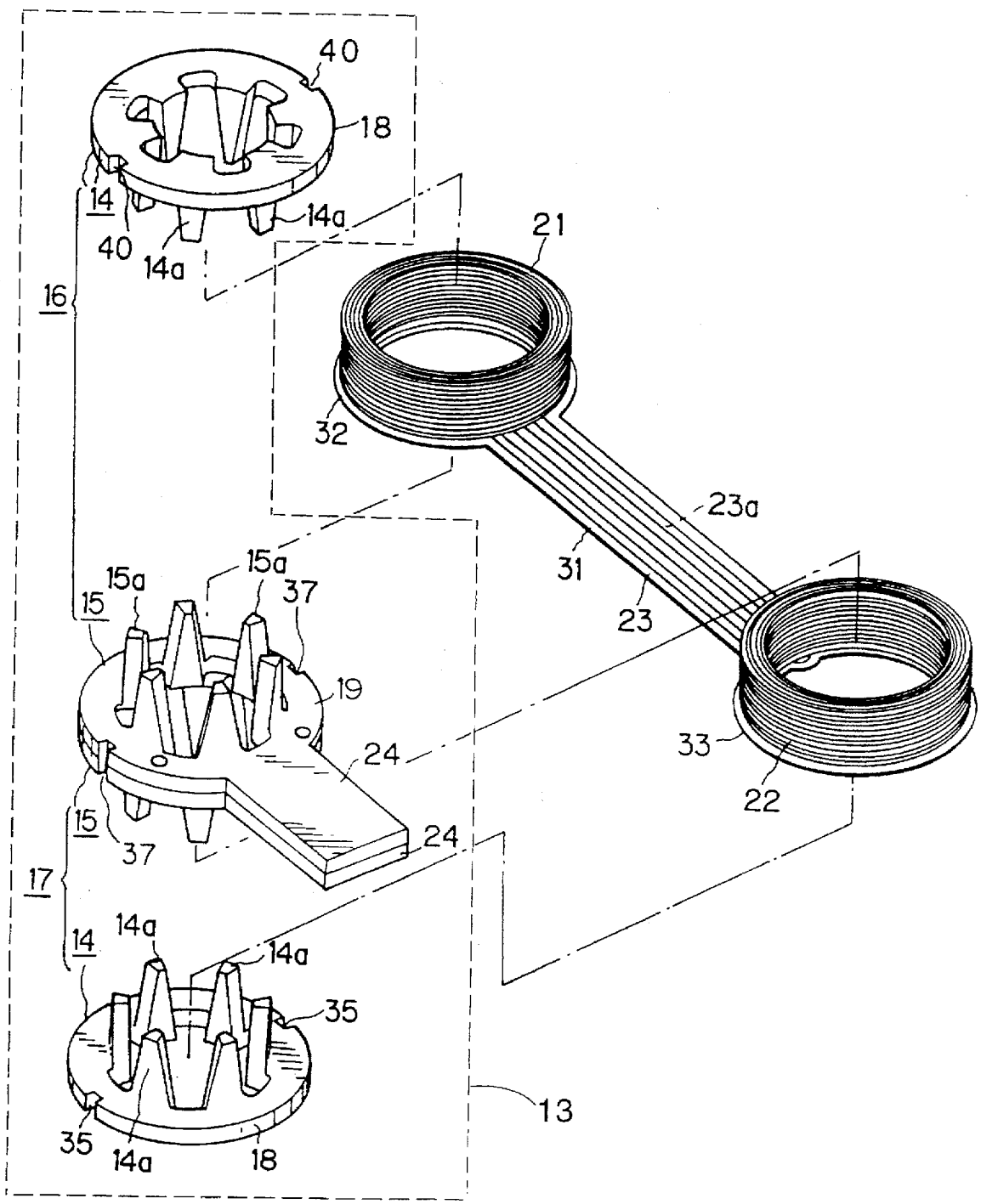
FIG. 6 is an exploded perspective view showing a stator of the iron core motor shown in FIG. 5.

The stator 13 has a first yoke 16 made up of a first pole tooth yoke 14 and a second pole tooth yoke 15 and a second yoke 17 made up of a first pole tooth yoke 14 and a second pole tooth yoke 15, as shown in FIG. 6. These first and second poles 16, 17 include pole teeth 14a, 15a associated with the magnetized portions 12a of the magnet 12, respectively.

The first pole tooth yoke 14 has a ring-shaped flange 18, from the inner periphery of which a plurality of, herein six pole teeth 14a are formed upright at an equal interval from one another in the circumferential direction, as shown in FIG. 6. These pole teeth 14a are tapered towards their distal ends while being narrowed towards the inner periphery.

Between neighboring pole teeth 14a is formed an interstice in which is engaged an associated one of the pole teeth 15a formed on the second pole tooth yoke 15.

The second pole tooth yoke 15 also has a ring-shaped flange 19, from the inner periphery of which a plurality of, herein six, pole teeth 15a are formed upright at an equal interval from one another in the circumferential direction. These pole teeth 15a are tapered towards their distal ends while being narrowed towards the inner periphery. Between neighboring pole teeth 15a is formed an interstice in which is engaged an associated one of the pole teeth 14a formed on the second pole tooth yoke 14. The flange 19 of the second pole tooth yoke 15 is formed as-one with a lug 24 supporting a flexible wiring substrate 23 constituting a feeder line for feeding first and second coils 21, 22 making up the stator 13.

The first pole tooth yoke 14 is molded with a synthetic resin for covering the pole tooth yoke 14 in its entirety for forming a bobbin 25 on which are fitted cylindrical first and second coil 21 and 22. The bobbin 25 has a tubular coil mounting portion 26 in the generally tubular pole teeth 14a about which are fitted the first or second coil 21 or 22. An upper supporting plate 27 or a lower supporting plate 28 is formed in a flange portion 28 of the first pole tooth yoke 14.

The inner periphery of the coil fitting portion 26 formed in the pole tooth portion 14a is configured to adapt itself to the shape of the pole teeth 14a and a pole tooth engaging portion 30 engaged by the pole teeth 15a of the second pole tooth yoke 15 is formed between neighboring resin coating portions 29 of the pole teeth 14a. The resin-coating portions 29 provide for electrical insulation between the pole teeth 14a of the first pole teeth 14 inter-engaged with the pole teeth 15a of the second tooth yoke 15.

The first and second pole tooth yokes 14 and 15 are engaged with each other with the pole teeth 14a, 15a meshing with one another, that is with the pole teeth 14a, 15a of the yoke 14 or 15 being positioned between the pole teeth 15a, 14a of the yoke 15 or 14, for making up the first yoke 16 and the second yoke 17.

The first and second yokes 16, 17 are superposed one on the other with the flanges 19 of the second pole tooth yokes 15 abutting to each other, as shown in FIG. 5.

The first and second coils 21, 22, mounted on the bobbin 25, are mounted on a flexible wiring substrate 23 constituting a feeder line so that the coils 21, 22 are electrically connected with one another. The flexible wiring substrate 23 has ring-shaped coil mounting portions 32, 33 at both ends of a connecting bar 31 carrying a wiring pattern 23a, as shown in FIG. 6. The first and second coils 21, 22 are mounted on the coil mounting portions 32, 33 with electrical connection to the wiring pattern 23a, as shown in FIG. 6. The first and second coils 21, 22 are mounted on the coil mounting portions 32, 33 using an electrically conductive adhesive or other types of the adhesive assuring electrical connection between the coils 21, 22 and the wiring patterns 23a.

The first and second coils 21, 22, mounted on the flexible wiring substrate 23, are fitted around the outer periphery of the pole teeth 15a, 15a so that the coil mounting portions 32, 33 are superposed on the flanges 19, 19 of the second pole tooth yokes 15, 15, as shown in FIG. 5. The connecting bar 31 of the flexible wiring substrate 23 is folded on itself for bringing the coil mounting portions 32, 33 into a facing relation to each other so that the connecting bar is disposed for encircling both sides of the lugs 24, 24 of the second pole tooth yokes 15, 15 abutted to each other. On a portion of the connecting bar 31 extended on the lugs 24, 24, the wiring pattern 23a is partially exposed to outside for connection to the feeder line connected to a driving circuit as later explained.

The coil mounting portions 32, 33 of the flexible wiring substrate 23 provide for positive electrical insulation between the coils 21, 22 and the second pole tooth yokes 15, 15.

The rotor 10 and the stator 13, constructed as described above, are built sequentially into a cylindrical motor casing 35, as shown in FIG. 5, for completing a stepping motor.

The sequence of assembling the stepping motor is now explained.

On the bottom of the motor casing 34 is housed the first pole tooth yoke 14 of the second yoke 17 making up the stator 13. The first pole tooth yoke 14 is housed in this manner by having a pair of positioning ribs 36, 36 mounted on the inner peripheral surface of the motor casing 34 engaged in engagement grooves 35, 35 formed in the outer periphery of the flange 18. The first pole tooth yoke 14 is arranged with controlled orientation in the motor casing 34 by the ribs 36, 36 being thus engaged in the grooves 35, 35.

The second pole tooth yokes 15, 15, abutted against each other for constituting the first and second yokes 16, 17, and having the first and second coils 21, 22 placed in position, are then housed within the motor casing 34. The second pole tooth yokes 15, 15 are housed within the motor casing with controlled orientation by the ribs 36, 36 engaged in a pair of engagement grooves 37, 37 formed in the outer periphery of the flanges 19, 19. Since the second pole tooth yokes 15, 15 are housed in this manner in the motor casing 34 with controlled orientation relative to the motor casing 34, the second pole tooth yokes 15 of the second yoke 17, disposed within the motor casing 34, have the pole teeth 15a engaged between neighboring pole teeth 14a of the first pole tooth yoke 14, so as to be unified to the first pole tooth yoke 14 to make up the second yoke 17.

When the second pole tooth yokes 15, 15 are housed within the motor casing 34, the lugs 24, 24 of the second pole tooth yokes 15, 15 are protruded out of the motor casing 34 via a cut-out 38 formed in the peripheral wall of the motor casing 34. Consequently, the connecting bar 31 of the flanged wiring substrate 23, extended over the lugs 24, 24, is also extended out of the motor casing 34.

Meanwhile, the first pole tooth yoke 14 and the second pole tooth yokes 15, 15 on the side of the second yoke 17 may be assembled to one another before being housed within the motor casing 34.

The rotor 10 is then inserted into the motor casing 34 by being passed through the first pole tooth yoke 14 and the pole tooth yokes 15, 15 on the side of the second yoke 17. At this time, the rotor shaft 11 of the rotor 10 has its one end 11b supported by a sintered metal bearing 39 provided at the center of the lower supporting plate 28 formed in the flange 18 of the first pole tooth yoke 14 of the first yoke 17.

The rotor 10 may be housed within the motor casing 34 before housing the first pole tooth yoke 14 and the second pole tooth yokes 15, 15 on the side of the second yoke 17.

The first pole tooth yoke 14 on the side of the first yoke 16 is housed within the motor casing 34 so as to be engaged with the opening end of the motor casing 34. The first pole tooth yoke 14 is mounted at this time with controlled orientation relative to the motor casing 34 by the ribs 36, 36 engaged in the engagement grooves 40, 40 formed in the outer periphery of the flange 18 of the first pole tooth yoke 14. Since the first pole tooth yoke 14 is housed in this manner in the motor casing 34 with controlled orientation relative to the motor casing 34, the second pole tooth yoke 14, disposed within the motor casing 34, has the pole teeth 14a engaged between neighboring pole teeth 15a of the second pole tooth yoke 15, so as to be unified to the second pole tooth yoke 15 to make up the first yoke 16.

Figure 7:
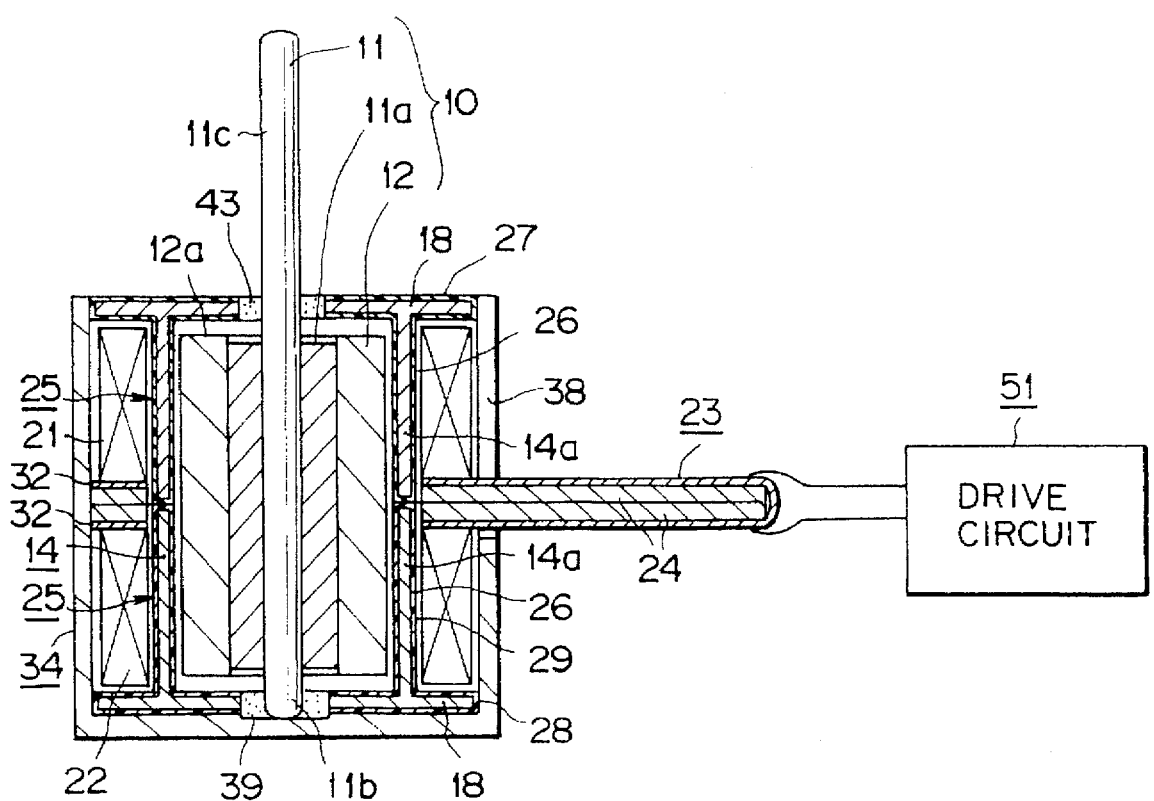
FIG. 7 is a longitudinal cross-sectional view of the iron core motor shown in FIG. 5.

When the first pole tooth yoke 14 on the side of the first yoke 16 is engaged with the opening side of the motor casing 34, the opposite end 11c of the rotor shaft 11 of the rotor 10 is protruded out of the motor casing 34 via a through-hole 42 formed at the center of the upper supporting plate 27. Meanwhile, the opposite end 11c of the rotor shaft 11 is rotatably supported by a sintered metal bearing 43 provided within the through-hole 42, as shown in FIG. 7.

The first pole tooth yoke 14 of the first yoke 16, fitted on the opening side of the motor casing 34, is secured to the motor casing 34 by caulking the opening end of the motor casing 34. With the first pole tooth yoke 14 of the first yoke 16 being thus secured to the motor casing 34, the rotor 10 has the one end 11b and a mid portion of the opposite end 11c supported by the sintered metal bearings 39,43 so as to be rotatably mounted within the motor casing 34 for completing the stepping motor.

Figure 8:
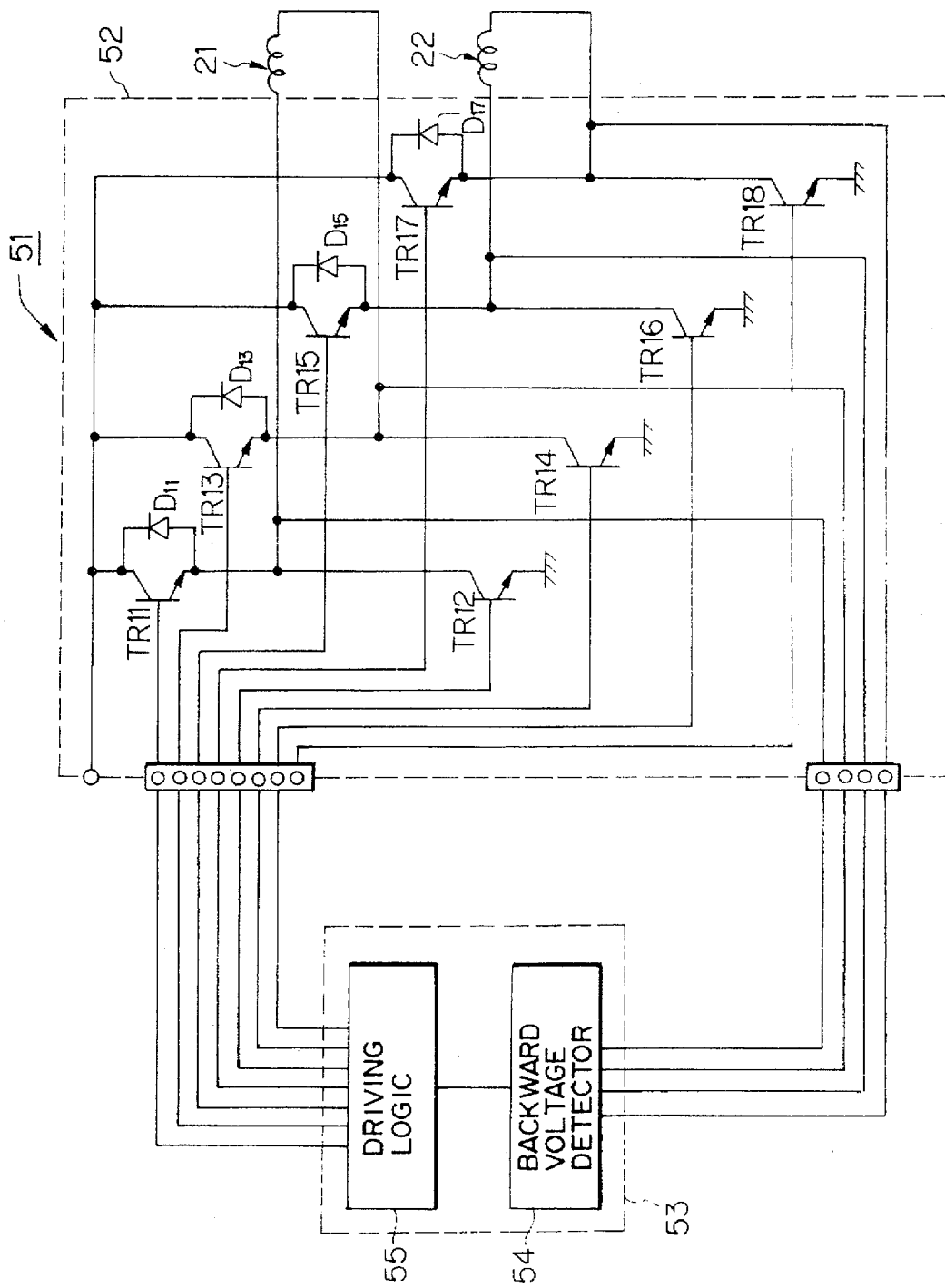
FIG. 8 is a schematic block circuit diagram of driving circuit of an iron core motor device according to the present invention.

The driving circuit for bi-polar driving the above-described stepping motor according to the present invention is explained by referring to FIG. 8. The driving circuit 51 shown in FIG. 8 is made up of a driving section 52 for supplying the pulsed driving current (driving pulse) to the first and second coils 21, 22 for rotating the rotor 10 and a driving control section 53 for controlling the driving timing of the driving section 52. The driving section 53 is made up of a backward voltage detector 54 for detecting the backward voltage generated across both ends of the coils of each phase and a driving logic 55 for outputting a timing signal controlling the driving section 52 based upon a signal from the detector 54. The driving control section 53 finds the relative position between the rotor 10 and the coils 21, 22, based upon the backward voltage induced in the coils 21, 22, that is a change in magnetic flux density $\phi$ of the coils of each phase relative to the angle electric $\Theta$, or $d\phi/d\Theta$, and generates a driving pulse based upon the position information between the rotor 10 and the coils 21, 22, for driving the stepping motor. That is, the driving circuit 51 drives the stepping motor in a sensor-less manner.

The operation of the driving section 52 is now explained.

Figure 9A:
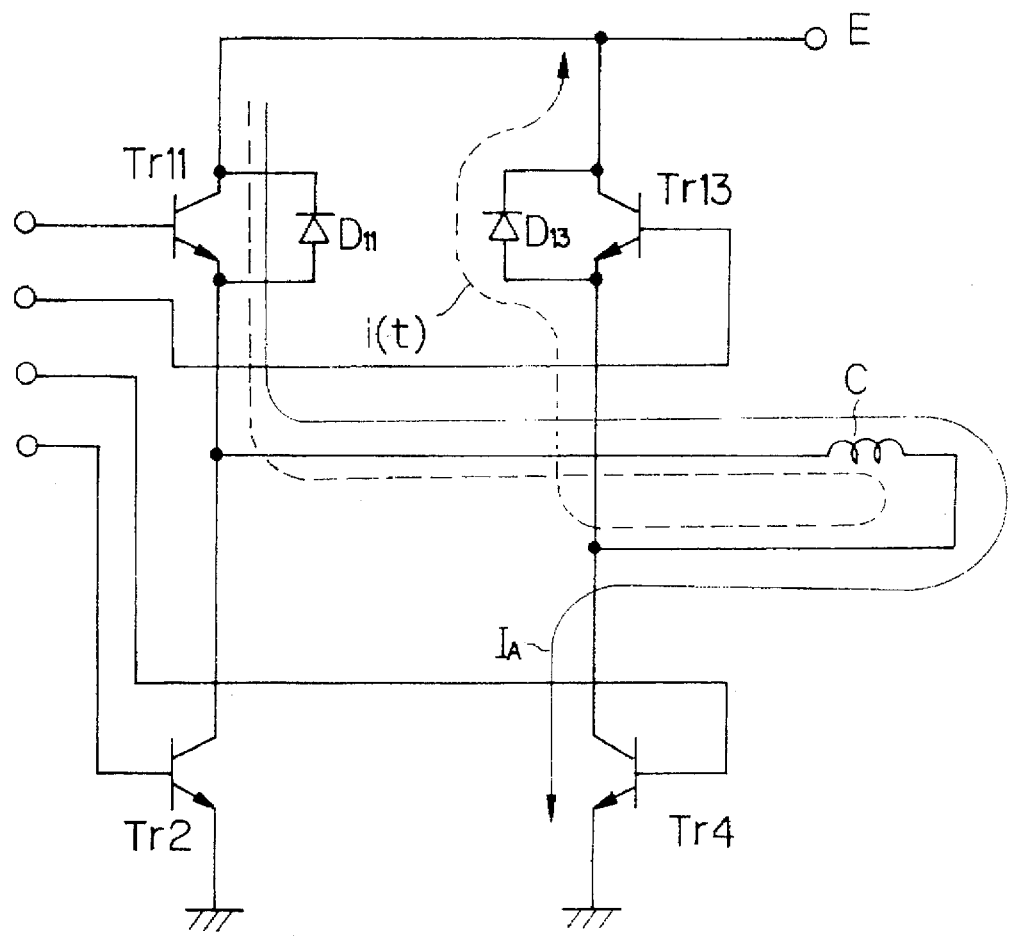
FIG. 9 is a circuit diagram showing the construction of the driving circuit driving a coil of one of the phases in the driving circuit shown in FIG. 8.

The basic construction of the driving section 52 shown in FIG. 8 is shown in FIG. 9a in which transistors Tr11, Tr13 have their collectors connected to a power source having a voltage $V_S$. The transistor Tr3 has its emitter connected to the collector of a transistor Tr14 and to the opposite end of the coil C. The emitters of the transistors Tr12, Tr14 are grounded. The emitters of these transistors Tr12, Tr14 may also be connected to a negative power source, not shown.

When both the transistors Tr11, Tr14 are turned on simultaneously, the exciting current flows through the transistor Tr11, coil C and the transistor Tr14. This exciting current $I_A$ is the current flowing through the A-phase coil $C_A$. If, after the transistor Tr14 is turned off and the transistor Tr11 is subsequently turned off after lapse of a pre-set time, the transistors Tr12, Tr14 are simultaneously turned on, the exciting current flows in the opposite direction to that of the exciting current $I_A$ through the transistor Tr13, coil C and the transistor Tr12. This sequence of operations is repeated for bi-polar driving of the stepping motor.

Figure 9B:
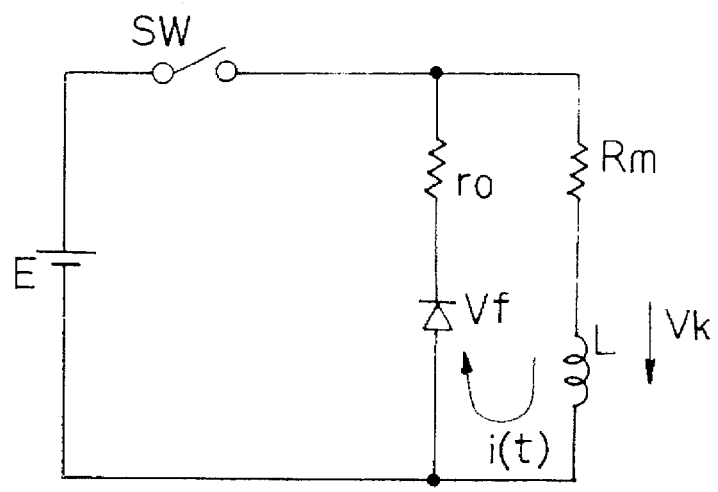

Directly after turning off of the transistor Tr4, the circuit shown in FIG. 9a is represented by an equivalent circuit shown in FIG. 9b. The closure current in this equivalent circuit now is calculated quantitatively.

The parameters employed in the equivalent circuit of FIG. 9b are the forward voltage drop $V_f$ of the diode, a resistance $r_0$ consisting of the on-resistance of the transistor and the on-resistance of the diode, taken together, an inductance L of the coil and the inner resistance $R_m$ of the coil. The forward voltage effect $V_f$ of the diode is set e.g. to 0.7 V.

The closure current i(t) flowing on turning off of the switch $S_W$ is represented by a differential equation (2)

$$(R_m + r_0) \cdot i(t) + V_f + L \cdot \frac{di}{dt} = 0 \tag{2}$$

If, for a domain in which the current i(t) is larger than zero, the initial value $i(0)=I_0$, and $R=R_m+r_0$, the equation (2) becomes an equation (3)

$$R \cdot i(t) + V_f + L \cdot \frac{di}{dt} = 0 \tag{3}$$

This equation is Laplace-transformed such that $$R \cdot I(s) + V_f/s + L \cdot \{s \cdot I(s) - i(0)\} = 0$$

$$(R+Ls)I(s) = L \cdot i(0) - V_f/s$$

The following equation (4)

$$I(s) = \frac{I_0 \cdot L}{Ls+R} - \frac{V_f}{s(Ls+R)} = \frac{I_0}{s+\frac{R}{L}} - \frac{\frac{V_f}{L}}{s\left(s+\frac{R}{L}\right)} \tag{4}$$

is obtained. If the second term of the equation (4) is modified to an inverse-Laplace transformable form, that is to a partial fraction, the partial fraction of the second term becomes $$\frac{\frac{V_f}{L}}{s \cdot \left(s+\frac{R}{L}\right)} = \frac{\alpha}{s} + \frac{\beta}{s+\frac{R}{L}} \tag{5}$$

where $\alpha$, $\beta$ are related to each other by the following equation (6)

$$\alpha(s+R/L)+s\beta=V_f/L \tag{6}$$

The conditions for the identity $\alpha(s+R/L)+s\beta=V_f/L$ to hold include $$\alpha=(V_f/L)\cdot(L/R)=V_f/R \tag{7}$$

$$\beta=-\alpha=-V_f/R \tag{8}$$

Thus the equation (4) becomes $$I(s) = \frac{I_0}{s+\frac{R}{L}} + \frac{\frac{V_f}{R}}{s} - \frac{\frac{V_f}{R}}{s+\frac{R}{L}} \tag{9}$$

This equation is Laplace-inverse-transformed to $$i(t) = \frac{E+V_f}{R_m+I_0} \cdot e^{-\frac{R_m+I_0}{L}t} - \frac{V_f}{R_m+I_0} \tag{10}$$

Using the relation of $R_m \gg r_0$, the equation (11)

$$i(t) = \left(I_0 + \frac{V_f}{R_m}\right) e^{-\frac{R_m}{L}t} - \frac{V_f}{R_m} \tag{11}$$

is obtained.

On the other hand, the transient build-up current i(t) flowing in the coil C when the transistors Tr11 and Tr14 shown in FIG. 9a are turned on simultaneously is $$i(t)=E/R_m\cdot\{1-\exp(-R_m t/L)\} \quad (12)$$

Figure 10A:
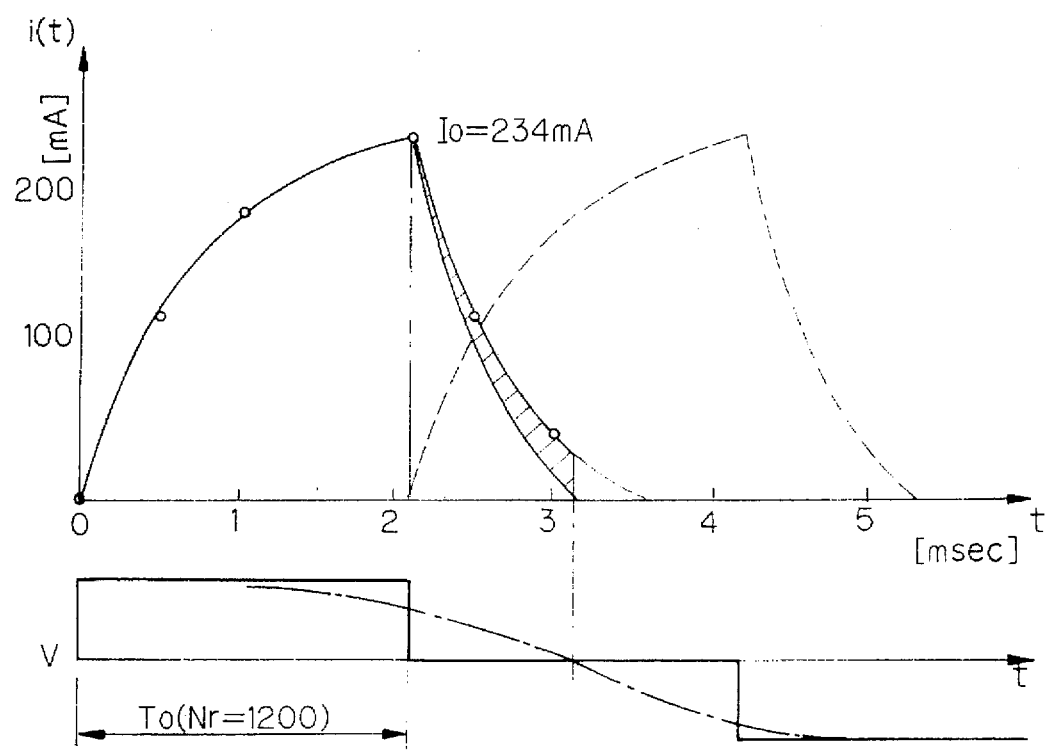
FIG. 10 illustrates the transient response waveform of the current outputted by the driving circuit of FIG. 8 to the coil.

If, with the actual parameters set such that the voltage E=10 V, the actual inner resistance $R_m$ of the coil=20 Ω, the coil inductance=15 mH, the number of magnetized portions=12, the rated rpm N=1200 rpm=20 rps and the forward voltage drop of the diode $V_f$=0.7 V, the actual closure current i(t) and the transient build-up current (t) are found, and these are combined with time shift, the waveform of the current flowing through the coil C is changed as shown by a curve O plotted in FIG. 10a. The pulse width $T_O$ of the pulse flowing in the two-phase 90° dephased coils is 2.08 msec (=(1/20)/(12/2)/4=0.00208 sec for the rated rpm $N_r$=1200 rpm and the time constant τ is 0.75 msec from $L/R_m$. On the other hand, the waveform of the closure current i(t) represented by the equation (1) by the conventional circuit shown in FIG. 1 becomes a waveform plotted (x) in FIG. 10a. That is, with the driving circuit 51 of the embodiment illustrated, more current flows through the coil C by an amount indicated by hatching in FIG. 10a.

Figure 10B:
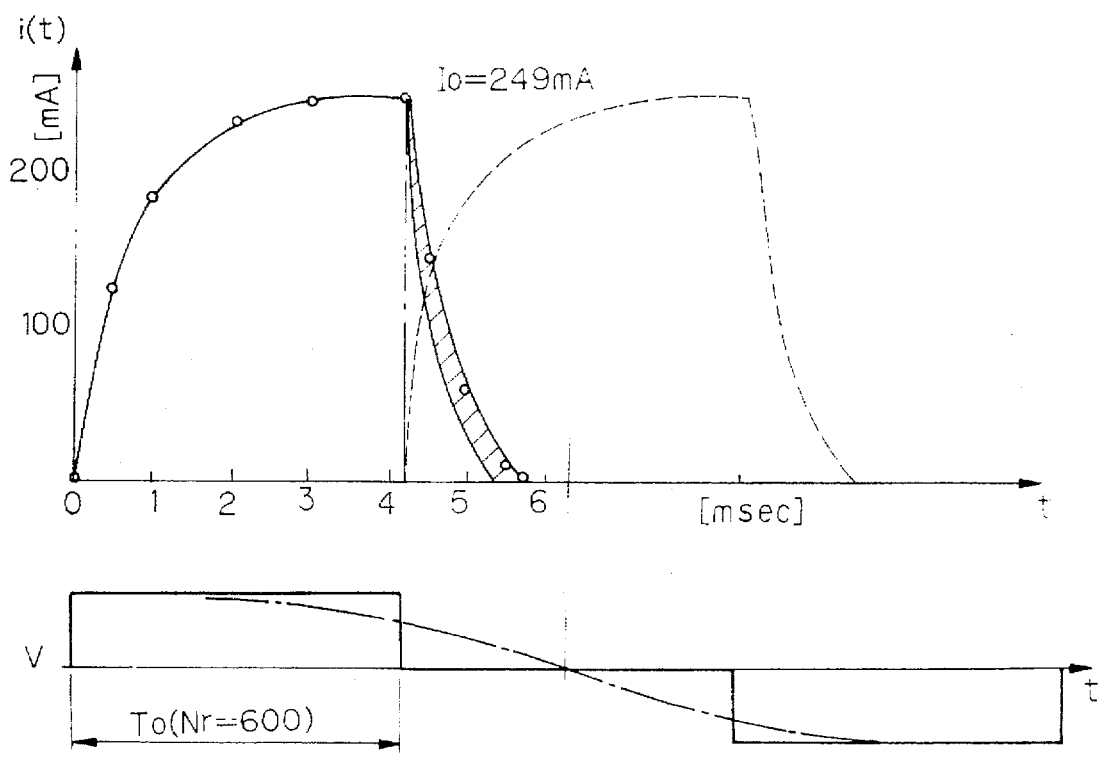

The current waveform for the rated rpm $N_r$ of the rotor 10 equal to 600 rpm is shown in FIG. 10b. In this case, more current flows through the coil C in an amount indicated by the hatching in FIG. 10b. In these figures, the current flowing in the opposite phase coil is indicated by broken lines.

If, in the driving current 51 shown in FIG. 8, the closure current i(t) in the coil 21, as found by the equation 11, is summed to the transient build-up current in the coil 22 as found by the equation 12, and the actual values are substituted, the sum current $i_M(t)$ becomes $$i_M(t) = \frac{E}{R_m}(1-e^{-\frac{R_m}{L}t})+\left(I_0+\frac{V_f}{R_m}\right)\cdot e^{-\frac{R_m}{L}t}-\frac{V_f}{R_m} \quad (12)$$

$$= \frac{E-V_f}{R_m}-\left(\frac{E-V_f}{R_m}-I_0\right)\cdot e^{-\frac{R_m}{L}t}$$

$$= \frac{5-0.7}{20}-\left(\frac{5-0.7}{20}-0.234\right)\cdot e^{-\frac{20}{15\times 10^{-3}}t}$$

Figure 11:
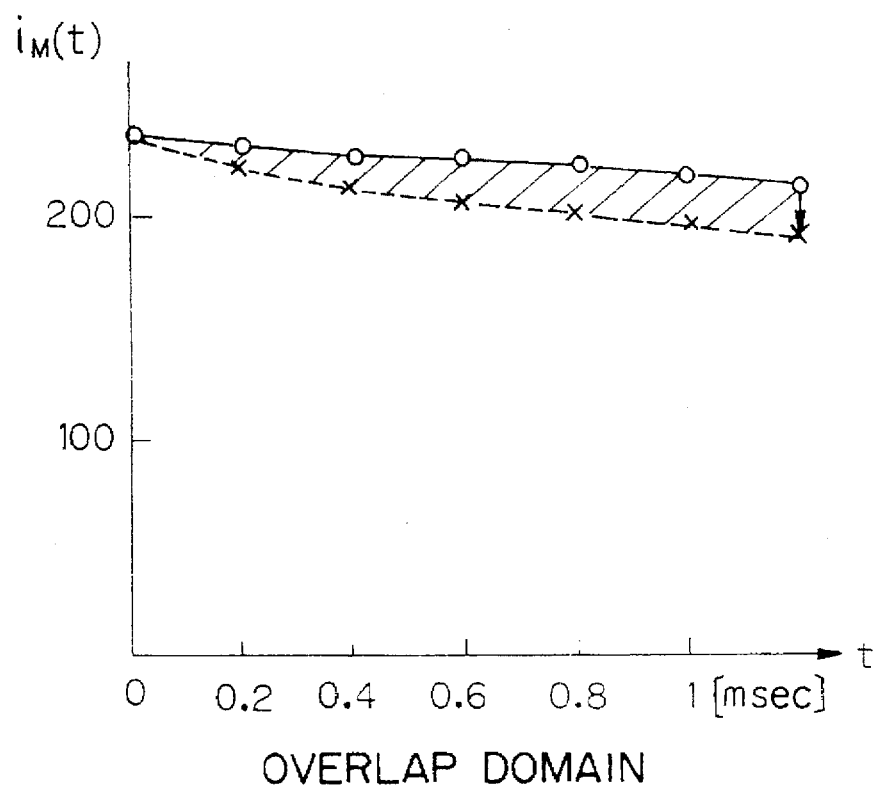
FIG. 11 is a graph showing the amount of the current for the overlapping period of the current outputted by the driving circuit.
Figure 12:
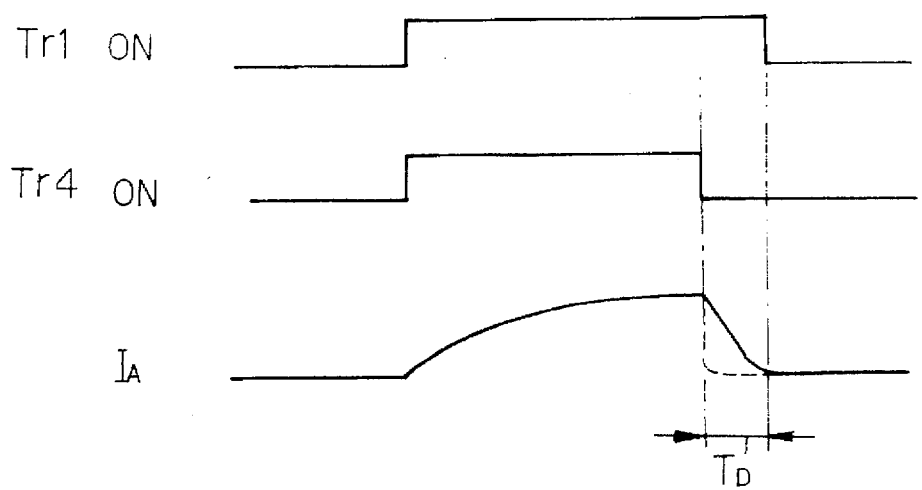
FIG. 12 is a timing chart for illustrating the transistor on/off state of the driving circuit and the amount of the current flowing in the coil.

If the overlapped portion of the currents flowing in the coils 21, 22 is illustrated, the current waveform for the overlapped portion $i_M(t)$ is as shown in FIG. 11. That is, the current $i_M(t)$ obtained by adding the closure current through the coil 21 to the transient build-up current in the coil 22 is of a substantially constant current waveform. For causing such closure current in a larger quantity, it suffices to continue the on-state of the transistor Tr11 until the diode $D_{13}$ in the circuit shown in FIG. 9 is turned off. That is, it suffices to delay the changeover timing of the transistor Tr11 from its on-state to its off-state by a time $T_D$ as compared to switching of the transistor Tr14 as shown in a schematic timing chart shown in FIG. 12.

However, for driving the stepping motor in a sensor-less manner, it is necessary to detect the backward voltage by the backward voltage detector 54. If the delay time $T_D$ is not less than half the pulse width $T_O$ during the current conduction as determined by such parameters as the rated rpm $N_r$, number of poles or the like, the zero-crossing positions of the backward voltage cannot be detected, as may be seen from FIG. 10a. Thus it becomes impossible for the driving circuit 51 of the stepping motor to drive the stepping motor in a sensor-less manner. The delay time $T_D$ enabling the proper amount of the closure current to be supplied and assuring satisfactory sensor-less driving is given by $$T_D=T_O/2-T_M \quad (13)$$

taking into account the operational margin $T_M$ of the backward voltage detection circuit 54.

If the operational margin $T_M$ is approximately zero, the delay time $T_D$ is on the order of one-half the pulse widths during current conduction.

In the driving current 51 shown in FIG. 8, if the switching from the on-state to the off-state of the driving signal supplied from the driving logic section 55 to the gates of the transistors TR11, TR13, TR15 and TR17 is delayed by the delay time $T_D$ as compared to the conventional case of simultaneously turning on and off the transistors TR1 and TR4, TR3 and TR2, TR5 and TR8 and TR7 and TR6, the path of the current produced by the kickback voltage, such as the current flowing in the coil 21, becomes the path from the transistor TR11, coil 21 and the diode $D_{13}$. Thus, with the present driving circuit 51, the diode voltage drop is decreased by one stage as compared to the conventional circuit. On the other hand, the current is correspondingly increased as the closure current by such one-stage decrease of the diode voltage drop. The above construction allows the number of the closure diodes to be decreased to one half.

On the other hand, since the noise superimposed on the grounding voltage is decreased, the backward voltage can be detected stably for stabilizing the motor driving operation.

Figure 13A:
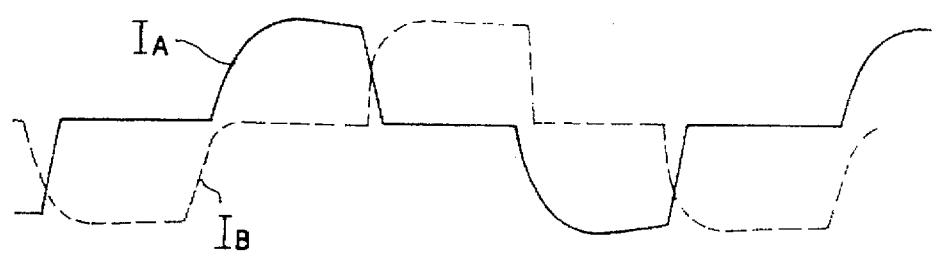
FIG. 13 is a waveform diagram showing the waveforms of the voltage and the current flowing from the driving circuit to the coil.
Figure 13B:
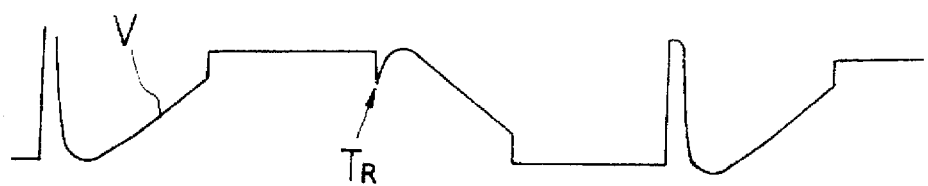

If the current conduction for the overlapped region is made in this manner, the gap region may be diminished, as shown in FIG. 13a. The torque ripple $T_{RI}$ produced in the voltage V across the coil ends may be reduced, as shown in FIG. 13b, so that a high torque may be obtained for the same stepping motor.

With the driving circuit 51 of the embodiment illustrated, the intrinsic driving current is enabled to flow more easily, so that the torque ripple is decreased to a lower value than conventionally, so that the stepping motor with a larger inductance may be turned into a high-torque motor, thus enabling the characteristics of the stepping motor to be improved. Besides, with the above-described construction, the number of the closure diodes may be halved thereby reducing the production cost.

In addition, since the noise superimposed on the grounding voltage may be reduced, the backward voltage may be detected more stably, thereby stabilizing the motor driving operation.

What is claimed is:

1. An iron core motor device comprising, a rotor which is rotationally driven a pre-set angle by electromagnetic induction responsive to phase switching of current supply to two-phase coils wound on an iron core, and driving control means for generating a driving control signal based on phase information of differentially phased backward voltages induced in said two-phase coils, wherein said driving control means causes shorting of a backward voltage induced in the two-phase coils the current conduction in which is interrupted by phase switching of current supplied to the two-phase coils by providing a pre-set time delay in the turn-off timing of a switching device connected to the coil the current conduction in which is interrupted.

2. The iron core motor device as claimed in claim 1, wherein said pre-set time $T_D$ by said driving control means is given by $$T_D=T_O/2-T_M,$$

where $T_O$ is the pulse width for the two-phase coils and $T_M$ is a margin for detecting the backward voltage.

3. The iron core motor device as claimed in claim 1, wherein said pre-set time by said driving control means is the time corresponding to about one-half the pulse width during the current conduction.

4. The iron core motor device as claimed in claim 1, wherein said driving control means comprises:

- a first power source terminal and a second power source terminal for supplying the driving current to each exciting winding of the coils of the two phases;
- a first switching device for phase switching connected between said first power source terminal and one end of said exciting winding;
- a second switching device for phase switching connected between said second power source terminal and one end of said exciting winding;
- a third switching device for phase switching connected between said first power source terminal and the opposite end of said exciting winding; and
- a fourth switching device for phase switching connected between said second power source terminal and the opposite end of said exciting winding, wherein when outputting the driving current to said exciting winding, the turn-off timing of the first switching device is delayed from the off-timing of the fourth switching means and the turn-off timing of the third switching device is delayed from the off-timing of the second switching means.

5. An iron core motor device comprising:

- a rotor which is rotationally driven a pre-set angle by electromagnetic induction responsive to phase switching of current supply to a plurality of coils wound on an iron core; and
- driving control means for shorting kickback voltage generated in an exciting winding the current conduction in which is interrupted by said phase switching by delaying the timing the switching device connected to the exciting winding is turned off.

6. The iron core motor device as claimed in claim 5, wherein said exciting winding is a two-phase motor winding.

7. The iron core motor device as claimed in claim 5, wherein said driving control means comprises:

- first and second power source terminals for supplying the driving current to said exciting winding;
- first switching means for phase switching connected across said first power source terminal and one end of said exciting winding;
- second switching means for phase switching connected across said second power source terminal and the one end of said exciting winding;
- third switching means for phase switching connected across said first power source terminal and the opposite end of said exciting winding;
- fourth switching means for phase switching connected across said second power source terminal and the opposite end of said exciting winding, wherein when outputting the driving current to said exciting winding, the turn-off timing of the first switching device is delayed from the off-timing of the fourth switching means and the turn-off timing of the third switching device is delayed from the off-timing of the second switching means.

8. A method for driving and controlling an iron motor device comprising an iron core motor a rotor of which is driven a pre-set angle by electromagnetic induction responsive to phase switching of current supplied to two-phase coils wound on an iron core, comprising:

- producing a driving control signal using phase information of differentially phased backward voltage generated in the two-phase coils by phase switching of current supply to the two-phase coils; and
- shorting the backward voltage induced in the two-phase coils the current conduction in which is interrupted by the phase switching of current supplied to the two-phase coils by providing a pre-set time delay in the turn-off timing of a switching device connected to the two-phase coils the current conduction in which is interrupted.

9. The method as claimed in claim 8, wherein said pre-set time delay is the time corresponding to about one-half the pulse width during the current conduction.

* * * * *